INVENTORS:
E. JACOBITTI
D. A. JAMES
C. G. MORRISON
J. B. NEWSOM

BY Donald M Duft

ATTORNEY

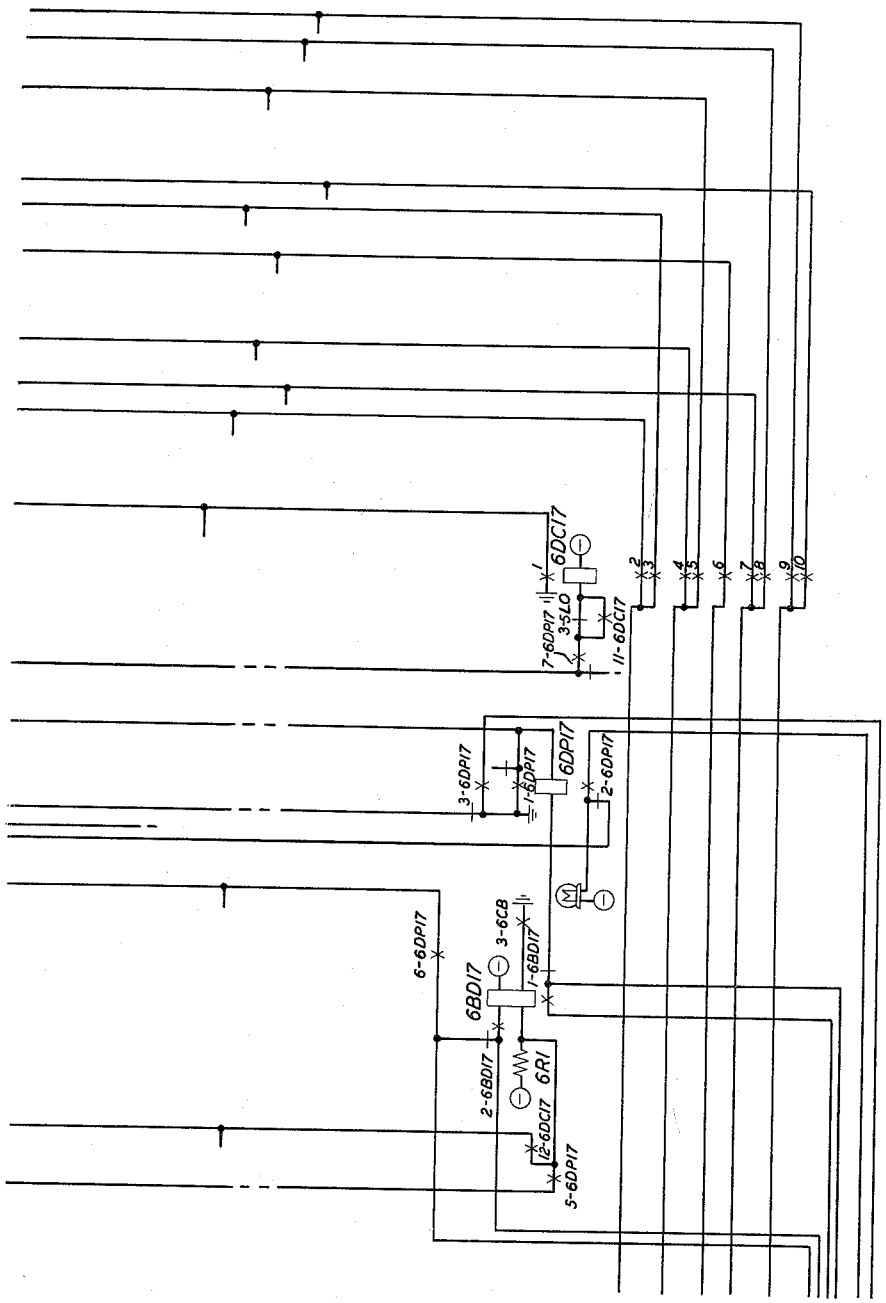

INVENTORS: E. JACOBITTI
D. A. JAMES
C. G. MORRISON
J. B. NEWSOM

BY Donald M. Ruft
ATTORNEY

United States Patent Office 3,025,357
Patented Mar. 13, 1962

3,025,357
CLASS TRANSLATOR CIRCUITS
Edward Jacobitti, Newark, Donald A. James, Union Hill, and Charles G. Morrison, Livingston, N.J., and James B. Newsom, Great Neck, N.Y., assignors to Bell Telephone Laboratories, Incorporated, New York, N.Y., a corporation of New York
Filed Dec. 28, 1956, Ser. No. 631,139
15 Claims. (Cl. 179—18)

This invention relates to an automatic switching system and more particularly to that part of the system comprising the common control equipment. More specifically, this invention pertains to a new and novel circuit for supplying information concerning the calling line or trunk to certain items of the common control equipment for each call.

In automatic switching systems of the common control type it is common practice for certain of the common control circuits to receive various bits of information concerning the incoming calling trunk or line in order that it may more efficiently and economically serve each call. These various bits of information are commonly referred to as class marks in the telephony art.

Heretofore, when toll traffic was handled manually, and when common control switching systems comprised only local switching offices capable of interconnecting subscribers living within a certain limited geographical area, the need for class marks was limited in comparison with the extensive use of these marks by present day switching systems. At that time, class marks, if used at all, were used to identify only the more basic characteristics of a calling line, such as whether it was a coin or non-coin line and whether its service was to be on a flat or message rate basis.

In present day switching systems capable of handling customer dialed nationwide toll calls, wherein the data for such calls is perforated on paper tapes either at a central or a tandem office, the need for class marks is quite extensive and it is not unusual for the common control circuits to require 40 to 50 different class marks pertaining to the calling line or trunk. These marks may indicate the area of origin of the calling subscriber when a single switching office contains the recording equipment and facilities for calls originated in any one of a plurality of toll areas. Such class marks may also indicate the recorder number of the recorder perforating the data for any call served by the trunk. Class marks may also indicate whether the incoming trunk is from an operator's position or from a subscriber.

In the switching systems known heretofore, such as that disclosed in the J. W. Gooderham et al. Patent No. 2,868,884, granted January 13, 1959, the class marks have been generated by the line or trunk circuits themselves, each of which has a limited number of relay contacts which, depending upon the normal or operated condition thereof, apply either singly or in combination, various potentials, such as ground, resistance battery, resistance ground, or battery, to the common control circuits, such as the sender, wherein various relays are operated to represent the combination of class marks associated with the incoming calling line or trunk. This method of generating class marks is far from ideal since, with the number of marks capable of being generated being extremely limited, it would be economically prohibitive to equip each and every trunk circuit with extra facilities for generating the additional class marks required when the facilities of the system are expanded.

In short, the method known and used heretofore for generating class marks cannot be economically expanded to provide the additional information required by present day switching systems. The current trend in the design of switching systems is in the direction of increased automation, such as for example, nationwide customer dialing, automatic message accounting, and eventually automatic revenue accounting facilities. Each of these features requires the use of more class mark information than has been needed heretofore and, therefore, it may be said that the trend in switching systems is towards the increased use of class mark information. It is, therefore, quite apparent that an economicol means for furnishing additional class mark information would be highly desirable.

It is an object of this invention to provide a class translator circuit for economically supplying class mark information to common control equipment in automatic switching systems.

It is a further object of this invention to provide a class translator circuit for economically supplying class mark information in as great a quantity as may be desired.

It is a further object of the invention to provide a class translator circuit which can easily and economically be expanded to provide as many bits of class mark information as might be needed by any switching system.

The present invention contemplates the provision of a separate and distinct circuit for supplying all the class mark information required by any of the common control circuits in a common control type switching system. It is further contemplated that the incoming line or trunk circuits and certain of the common control circuits, which heretofore were equipped to generate class mark information, may be greatly simplified since they will no longer be concerned with this function which will now be exclusively handled by the new and novel class mark circuit.

Each telephone switching office, whether it be of the local or toll type, may have say 10,000 lines or trunks incoming thereto, which lines or trunks are subdivided into a plurality of groups. All of the lines or trunks within a group are of the same type and have the same combinations of class mark data associated therewith. For example, the lines or trunks within a certain group may be connected to coin type public telephones and, therefore, the class mark information associated therewith will indicate to the common control equipment that the proper charges are to be collected from the originating subscriber before any call should be completed. Another group of lines or trunks may be connected to originating subscribers who are billed on a flat rate basis and therefore, records need not be made of their local calls.

In a toll switching office, all the trunks within a certain group may be connected to a central office which has its own recording equipment and, therefore, the class mark information at the toll center will indicate to the common control equipment therein that the toll center's automatic message accounting equipment need not record data for the calls handled by these trunks. On the other hand, another group of trunks at the same toll center may be from a local office having no automatic message accounting equipment of its own and, therefore, the class mark information for this group will indicate to the common control equipment that the toll center's automatic message accounting equipment should make records of the calls handled by these trunks. In short, while the number of incoming lines or trunks to any one office may be quite large, such as 10,000 for example, many of these lines or trunks are similar to one another and are, therefore, divided into a plurality of groups, of which in a practical office at the present time, one might find perhaps 50 to 100 of such groups.

All the lines or trunks in each group have the same combination of class marks associated therewith, and, therefore, the job of the class translator circuit is simplified somewhat since it need only supply as many different combinations of class mark information as there are groups of incoming lines or trunks. For example, if there are 50 groups of incoming lines or trunks, the class translator circuit need only supply 50 different combinations of class mark data to the common control circuits. Continuing with the example of 50 groups of incoming lines or trunks, there would be 50 output relays in the class translator with each being individually associated with one of the groups of incoming lines or trunks. The contacts on each of these relays are wired in such a manner that the operation of a relay closes circuits to the common control equipment to represent the class mark data pertaining to the incoming group associated with the operated relay.

Each incoming line or trunk is operatively related to one of the output relays in the class translator through the agency of a common control means, such as the sender link in the forementioned Gooderham et al. patent in which link each incoming line or trunk has a unique appearance. The seizure of an incoming line or trunk closes the cross-points in the sender link and, as a result, a circuit is prepared to operate the proper one of the output relays in the class translator circuit when it is later seized by the common control circuits.

The operation of the class translator circuit and its relationship to the rest of the system may perhaps best be illustrated in connection with a common control system of the prior art. Therefore, throughout the remainder of this specification the operation of the present invention is described in connection with the toll switching system shown in the aforementioned Gooderham et al. patent.

The present description and drawings describe and show only those parts of the J. W. Gooderham et al. patent as are necessary for an understanding of the present invention. The association of the present invention with the Gooderham et al. system is not to be construed as implying that it can be used only with this system since it may be used with any common control switching system requiring the need of class marks to identify the characteristics of the incoming lines or trunks.

For example, the present invention could be utilized as a source of class mark information in any of the well-known crossbar switching systems. The operation of the resulting system in response to the reception of a call thereto would be as follows. Each incoming call is manifested by the operation of the trunk circuit associated with the trunk handling the call. The operation of the trunk circuit effects subsequent circuit operations whereby it may be interconnected briefly with the common control circuits, which then receive control signals (such as, for example, dial pulses) from the incoming trunk in order that it may be connected to a desired outgoing trunk. The first circuit seized by the incoming trunk comprises, for all intents and purposes, a cross-connection medium which serves to interconnect the incoming trunk to the common control circuits. In many crossbar systems this cross-connection medium is commonly referred to as the sender link.

After the incoming trunk has been interconnected with the common control equipment, it transmits control information pertaining to the call to the common control equipment which then undertakes to complete the call and progresses in its operation to the point where the class mark information is needed. At this point, the circuits needing the class mark information interconnect themselves with the class translator circuit. The seizure of the class translator causes the operation of the proper one of the output relays which feed back to the common control circuits information pertaining to the incoming trunk handling the call now being served. As has been said before, the output relays are operatively associated with the incoming line and trunk circuits by means of connections at the sender link circuit wherein said incoming line or trunk has a unique and distinctive appearance.

After the common control circuit receives the class mark information from the class translator, it releases the class translator and makes it available for the serving of other calls. The common control equipment which just received this class information then proceeds in its operation so that the calling party may be interconnected with the desired line or trunk.

A feature of the invention is the provision of a separate and individual circuit which furnishes class mark information when it is seized by certain of the common control circuits in a switching system.

A further feature of the invention is the provision of a class circuit which contains a plurality of output relays, each of which is exclusively associated with an individual line or trunk group, and each of which, when operated, supplies class mark information to common control circuits.

A further feature of the invention is the provision of a class translator circuit for furnishing class information to common control circuits in a switching system wherein the identity of a calling trunk is ascertained from the operated crosspoints in a sender link circuit, which crosspoints are also used to operate an output relay in the class translator circuit to supply the desired bits of class mark information to the common control circuits.

A further feature of the invention is the provision of a class translator circuit for furnishing class information to common control circuits in a switching system wherein the identity of the calling trunk is ascertained from the operated crosspoints in a crossbar sender link circuit, which crosspoints are also used to interconnect the incoming trung to a sender circuit.

A further feature of the invention is the provision of a plurality of closs translator circuits in a switching center in order to increase the call handling capacity therein.

A further feature of the invention is the arranging of the class translator circuits in pairs so that an incoming call is served by the first class translator in a pair, if said first one is idle, and alternatively, is served by the second class translator in said pair when the first class translator is busy.

A further feature of the invention is the provision of preference circuits in each class translator so that the facilities of the class translator are made available to a plurality of common control circuits in a predetermined order of preference.

These and other objects and features of the present invention may be more fully understood from the following description of an exemplary embodiment thereof when read with reference to the accompanying drawings in which:

FIGS. 1 through 6 together disclose the detailed circuits of the present invention;

FIG. 7 shows how FIGS. 1 through 6 should be arranged with respect to each other; and FIG. 8 discloses in block diagram form how the present invention could be combined with the system shown in the aforementioned J. W. Gooderham et al. patent.

GENERAL DESCRIPTION

In the present disclosure the invention is shown in combination with certain elements of the system disclosed in the aforementioned J. W. Gooderham et al. patent in order to illustrate its applicability and utility to common control automatic switching systems. This showing is merely exemplary, however, since the principles of the present invention could be utilized to advantage in any common control switching system.

Before beginning with the description of the present invention, it is believed that a few brief remarks concerning the original system disclosed by J. W. Gooderham et al. would be worthwhile. In this connection, reference is made to FIG. 271 of the drawings in Gooderham et al. wherein is shown in block diagram form the various circuit elements constituting his system. In this system, an incoming call is manifested by the seizure of one of the incoming trunk circuits 27117 through 27129, depending upon the source of the call. For example, the call might have been originated by subscriber 27109 contacting the long distance operator at toll switchboard 27113 via his local office 27111, which could either be manual or dial. After receiving the desired called party's number, the operator at toll switchboard 27113 interconnects switchboard 27113 with trunk circuit 27120.

Once trunk 27120 has been seized by the operator at switchboard 27113, it connects itself to one of the available sender links as the first step in reaching a sender, such as dial pulse sender 27125. The sender link circuit is an elaborate cross-connection medium comprising a plurality of crossbar switches, arranged and interconnected in such a manner so as to connect any one of a plurality of incoming trunk circuits to any one of a plurality of sender circuits. The circuits represented by the boxes entitled, "Link Control" and "Control Connector" are control circuits for the sender link and, once an incoming trunk seizes the sender link, these circuits find an available idle sender, find an idle path between the incoming trunk appearance and the idle sender, and finally, interconnect the incoming trunk appearance to the idle sender.

A dial tone is supplied to the operator at toll switchboard 27113 once the incoming trunk 27120 has been connected, by means of the sender link, to an available dial pulse sender, such as 27125. The toll operator then dials into the sender the number of the desired called party. Once the sender has received this information, it proceeds with the necessary circuit operations to enable the incoming trunk to be connected with an outgoing trunk leading to the office serving the called party. As is fully described in the J. W. Gooderham et al. patent, the first operation performed by the sender towards this end is to connect itself to an idle decoder by means of a decoder connector.

The decoder, among other things, determines and then tells the other units of the common control equipment, including the marker, which of the available routes should be utilized in reaching the called subscriber. Once the decoder is connected to the sender by means of the decoder connector, it receives the called party's area and office code from the sender. At this time, it also receives the aforementioned class marks from the sender. These class marks supply the decoder with the class mark information it needs to know about the calling trunk so that with this information, plus that already received from the sender, it can process the call in the desired manner. Once the decoder finishes its operation, it connects itself by means of a marker connector to an available marker which, in connection with the sender, controls the remaining circuit operations necessary to interconnect the incoming trunk from the calling subscriber to an outgoing trunk leading to the office serving the called subscriber, all as described in J. W. Gooderham et al.

In the Gooderham et al. system the class marks are generated by the trunk circuits in combination with the other common control circuits, such as the sender. As has been mentioned before, the trunk circuits have a limited number of relay contacts which, depending upon the normal or operated condition thereof, apply either singly or in combination, various potentials such as ground, resistance battery, resistance ground, or battery, to certain of the common control circuits, such as the sender, wherein various relays are operated to represent the combination of class marks associated with the incoming trunks. This method of generating class marks leaves much to be desired since it is not capable of being expanded to the extent required by present day switching systems.

Before proceeding further with the description of the invention, it is believed that a few brief comments concerning both the drawings and the symbols used therein will be beneficial. The circuit is disclosed in what is known as the detached contact mode of presentation. The term "detached contact" refers to the fact that the contacts of each relay are not necessarily shown adjacent the winding of the same relay but, instead, are shown in close proximity to the circuit of which they are a part or, of whose operation they control.

In this presentation a normally closed break contact, which opens in response to the operation of its relay, is represented as a short line intersecting a wire. The portions of the wire on each side of the short line are disconnected from one another upon the operation of the break contact. For example, referring to decoder 0 on FIG. 1, the upper left-hand corner of the decoder contains break contact 1 of relay CLK (designated 1–1CLK). The operation of relay CLK disengages the ground on the left side of this contact from that portion of the circuit connected to the right side of the contact.

A make contact is represented in this system by two intersecting short lines placed atop the wire comprising the circuit of which they are a part. For example, again referring to decoder 0, contacts 1 and 2 on relay 1AMA are both make contacts and each closes the circuit of which it is a part upon the operation of relay 1AMA.

The relays and relay contacts in the present circuit are designated in a manner designed to facilitate easy location and identification. The letters in the designation of a relay refer to the function performed by the relay. For example, referring to relay 3DC0 in the upper center portion of FIG. 3, the letters DC represent the term "Decoder Connector," since as will be seen hereinafter, the operation of this relay connects the output relays of the class translator to the decoder. The digits after the letters in the designation of a relay indicate that the relay is one of a series of like relays and the numerical value of the digit identifies the location of that particular relay in the series. For example, a study of FIGS. 3 and 4 shows that relay 3DC0 is the first one in a chain of relays comprising relays 3DC0, 3DC1, plus relays 4DC2 through 4DC16, which are not shown, and relay 4DC17 which is shown on the bottom center portion of FIG. 4. Thus, the digit 0 after the letters DC in the relay 3DC0 indicates that it is the first in a series of 18 relays.

There are a number of places in the following portion of the specification in which a series of relays, such as the series of which relay 3DC0 is a part, is discussed at length in order to show the relationship between the relays comprising the series. In a number of these instances the relays comprising the series are identified by enumerating the letters in the designation of the relay followed by a dash, such as DC—. This is believed to be a more advantageous method of identifying and discussing a series of relays than would be the case if one were to laboriously enumerate every relay contained in the series each time it is desired to refer to the series. For example, there are many instances in the following description wherein the series of relays 3DC0, 3DC1 through 4DC17 are referred to as a DC— series of relays. Obviously, this is a much more convenient method of identifying a series of relays when discussing the features or characteristics of the entire series.

The numerals immediately preceding the letters in a relay designation identify the sheet of drawings on which the winding of the relay appears. For example, relays 3DC0 and 3DC1 are on FIG. 3 while relay 4DC17 is on FIG. 4.

The relay contacts are designated in two different ways depending upon their location. Each contact is designated by a single digit where all or most of the contacts for the relay are in a line and are adjacent of the winding of the relay. For example, with reference to relay 3DC0, most of its contacts are in a single vertical line adjacent the winding of the relay and are designated 1 through 9.

The relay contacts which are not both in a single line and immediately adjacent their winding are designated by a digit followed by a dash followed by the designation of their relay. For example, again referring to relay 3DC0, it has a make contact which is in the circuit over which its winding is energized. This is shown immediately to the left of its winding on FIG. 3 and is designated 10–3DC0. The designation 10 signifies that this is the tenth set of contacts on the relay while the designation 3DC0 identifies the winding of the relay. This method of designating relays and relay contacts is believed to be highly informative and functional since it allows the reader at a glance to locate a relay referred to in the specification without needless hunting through the drawings.

FIGS. 1 through 6 and FIG. 8 of the drawings disclose how the present invention may be utilized with the switching system disclosed in J. W. Gooderham et al. to provide a means whereby the common control equipment may be furnished class mark information in a new and novel manner capable of undergoing expansion to whatever degree may be desired by any present or future switching system. These drawings disclose the circuits of the present invention together with certain skeletonized elements of the J. W. Gooderham et al. system as are needed for an understanding of the present invention.

When the class translator comprising the present invention is utilized in the J. W. Gooderham et al. system, the system operation upon the reception of a call by one of the incoming trunks would be identical to the operation just described in connection with FIG. 271 of J. W. Gooderham et al. up to the point where the decoder has been seized by the sender. In J. W. Gooderham et al., once the decoder was seized by the sender, it obtained the necessary class mark information from the sender. In the system comprising the present invention and shown in FIGS. 1 through 6 and FIG. 8, the decoder obtains the class mark information from the new and novel class translator circuit.

FIG. 8 shows in block diagram form how the present invention may be combined with the system disclosed by J. W. Gooderham et al. Except for the addition of the box entitled, "Trunk Class Translator," together with the three wires connected thereto, this block diagram discloses in simplified form the same system as that shown in FIG. 271 of J. W. Gooderham et al.

The incoming trunk shown in FIG. 8 is seized in response to a call incoming to the office. It proceeds, in a manner already described herein in connection with FIG. 271 of J. W. Gooderham et al., to connect itself to an incoming sender by means of the sender link. The sender, after receiving control information from the preceding office, connects itself to the decoder by means of the decoder connector. The decoder now seizes the trunk class translator as a first step in obtaining the trunk class information it needs. The seizure of the trunk class translator by the decoder causes the trunk class translator to close a circuit that extends through parts of the sender link and parts of the decoder connector back to the trunk class translator so that the class translator may ascertain in what trunk group the calling trunk is located. The class translator has a plurality of output relays and the one output relay that is exclusively associated with the trunk group in which the calling trunk is located now operates and, by means of its contacts, transmits the proper class mark information to the decoder. The decoder takes this information and, together with the information it has already received from the sender, proceeds to perform its circuit functions. From here on out, the circuit operations concomitant to the interconnection of the incoming trunk with an outgoing trunk are identical to those described in J. W. Gooderham et al. and, therefore, need not be repeated herein.

Detailed Description

Figure 8:
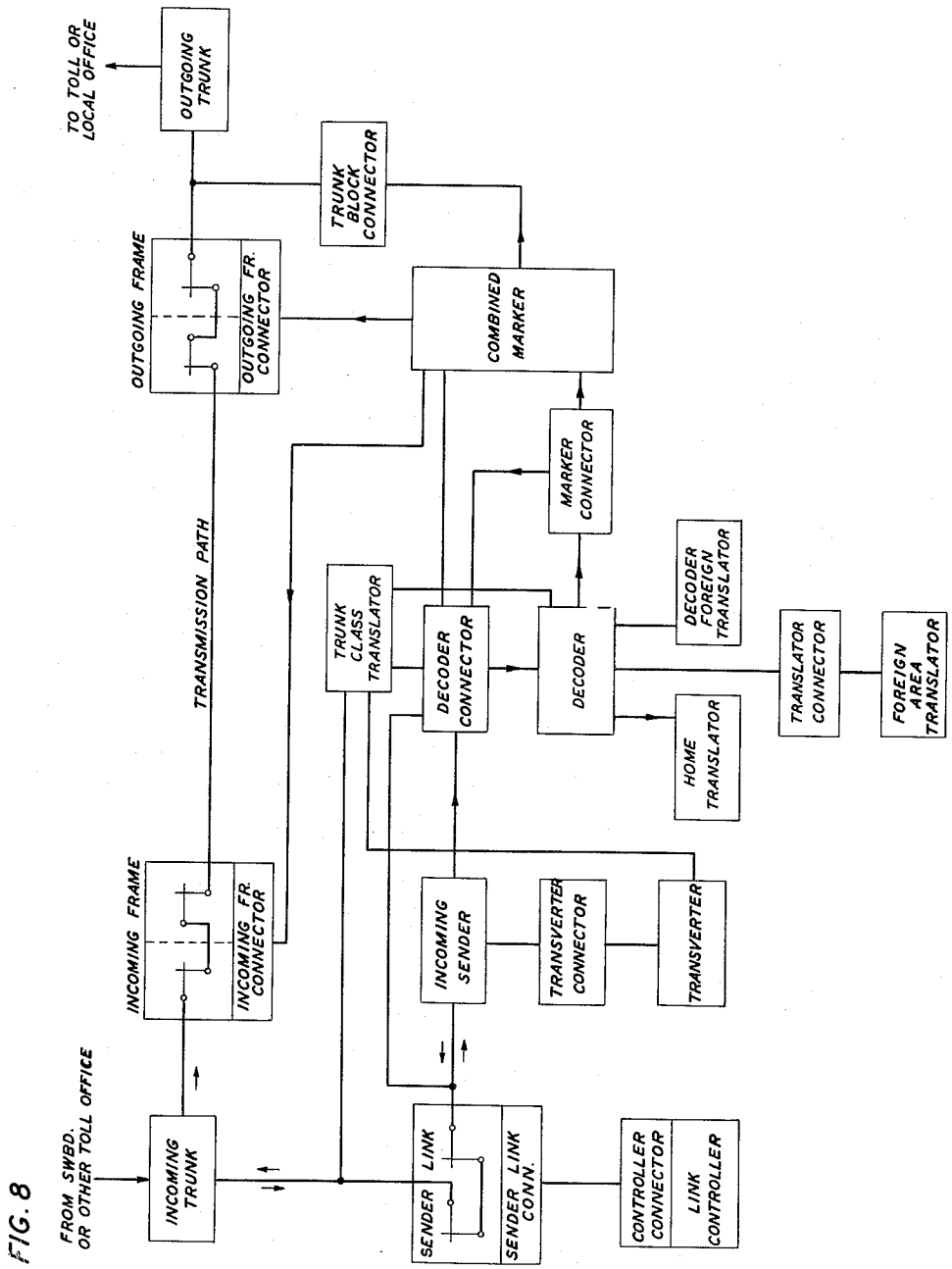

The operation of the system shown in block diagram form in FIG. 8 and shown in detail in FIGS. 1 through 6 upon the reception of a call by the incoming trunk is identical to the operation of the system already described herein in connection with FIG. 271 of J. W. Gooderham et al. up to the point where the decoder is seized by the sender and then receives class mark information from the sender. In the system shown in FIG. 8 the decoder receives the class mark information from the new and novel class translator instead of from the sender and, therefore, the present description begins with that point in the call where the decoder after having been seized by the sender attempts to interconnect itself with the class translator.

The commercial embodiment of the J. W. Gooderham et al. system has 18 decoders in order to increase the capacity of the office in handling incoming calls. These 18 decoders are shown on FIGS. 1 and 2 of the drawings with decoders 0 and 17 being shown in some detail and with decoders 1 through 16 being shown in diagrammatic form only. Let it be assumed that sender 2 has been interconnected with decoder 17, shown on FIG. 2. The seizure of decoder 17 by the decoder connector and by the sender closes a ground from the decoder connector to operate relay 2AMA in decoder 17. The operation of this relay initiates the circuit actions about to be described to supply the class mark information to the decoder.

The operation of relay 2AMA closes a circuit to operate relay 4DP17 from negative battery in decoder 17, through break contacts 2–CLK, make contacts 2 of relay 2AMA, break contacts 1–4BD17, to the winding of relay 4DP17. Each of the 18 decoders is individually associated with one of the relays in the chain of DP-relays shown on FIGS. 3 and 4 and, each of the decoders attempts to operate its related DP-relay as it tries to seize a class translator circuit. For example, decoder 0 is exclusively associated with relay 3DP0 while decoder 17 is associated with relay 4DP17. Similarly, relay 3DP1 is associated with decoder 1, shown only in diagrammatic form, while relays 4DP2 through 4DP16, not shown, are associated with decoders 2 through 16, which are only shown in diagrammatic form.

The contacts of relays 3DP0 through 4DP17 constitute what is known in the art as a preference circuit which provides for an orderly sequence of events upon the attempted simultaneous seizure of a class translator circuit by two or more decoders. The preference circuit functionally arranges each of the decoders in a predetermined order of preference so that the serving of a particular decoder is preferred over the serving of any other decoder in the event that two or more decoders simultaneously attempt to seize the class translator shown on FIGS. 3 and 4.

In this particular preference chain, the preferred decoder is decoder 17 while the remaining decoders are arranged in a descending order of preference with decoder 16 being second preferred and so on down to decoder 0 which is the last preferred. The effect of this arrangement is to insure that decoder 17 will always win out to operate its DP-relay over any other decoder while decoder 0 will invariably lose to any other simultaneously operatin decoder in attempting to operate its DP-relay.

The operation of relay 4DP17 in response to the closure of contacts 2 of relay 2AMA closes a circuit to operate relay 3CB from ground through normal contacts 1–2CLK (the winding for which is not shown), through contacts 1 of relay 2AMA operated, through contacts 6–4DP17 operated, to the winding of relay 3CB. The operation of relay 3CB causes its contacts 1, 2, and 3, as shown on FIGS. 3 and 4, to place a ground on the left side of the lower winding on each of relays 3BD0, 3BD1 through 4BD17. The right side of the lower winding on each of these relays is connected through a resistance to negative battery.

All but one of the BD-relays now operate due to the following considerations. The resistance battery side of the lower winding of each of these relays is connected to a preference chain formed by the contacts of relays 3PD0, 3PD1 through 4PD17. This preference chain is arranged so that it can apply a direct ground to only one of the BD-relays at a time beginning with relay 3BD0, which is the preferred one, and ending with relay 4BD17 which is the last preferred of the group. This preference circuit insures that only one of the BD-relays will have the right side of its lower winding grounded by this preference circuit and hence, only it will be the one relay not to operate as relay 3CB operates and applies a ground to the left side of the lower winding of each of these relays. All the BD-relays, except one, operate in response to the operation of relay 3CB.

The preference circuit is used in connection with the operation of the BD-relays because, due to the nature of the preference chain associated with the operation path of the DP-relays, it is possible for more than one DP-relay to be operated at a time. For example, assume that decoder 0 seizes this circuit at a time when all the other decoders are idle and operates relay 3DP0 from battery in decoder 0, through break contacts 2–1CLK, make contacts 2 of relay 1AMA, break contacts 2–3BD0 to the winding of relay 3PD0 which operates from ground on the preference circuit and locks to the ground on its make contacts 2–3PD0. A short time later, decoder 17 may attempt to seize this same class translator circuit by operating its relay 4DP17 which is uneffected by operated relay 3DP0 by virtue of the fact that the ground for this preference chain is directly connected to one side of the winding of relay 4DP17 and, therefore, it can operate from the battery in decoder 17 despite the previous operation of relay 3DP0.

The operation of both relays 3PD0 and 4PD17 causes no difficulty since the preference chain formed by the DP-relay contacts associated with the operation of the BD-relays allows a ground to be applied to the resistance battery sides of the lower winding of only one of the BD-relays regardless of how many DP-relays are operated and, therefore, when relay 3CB operates and applies a ground to the left side of the lower winding on each of these relays, all but one of these will operate.

Figure 3:
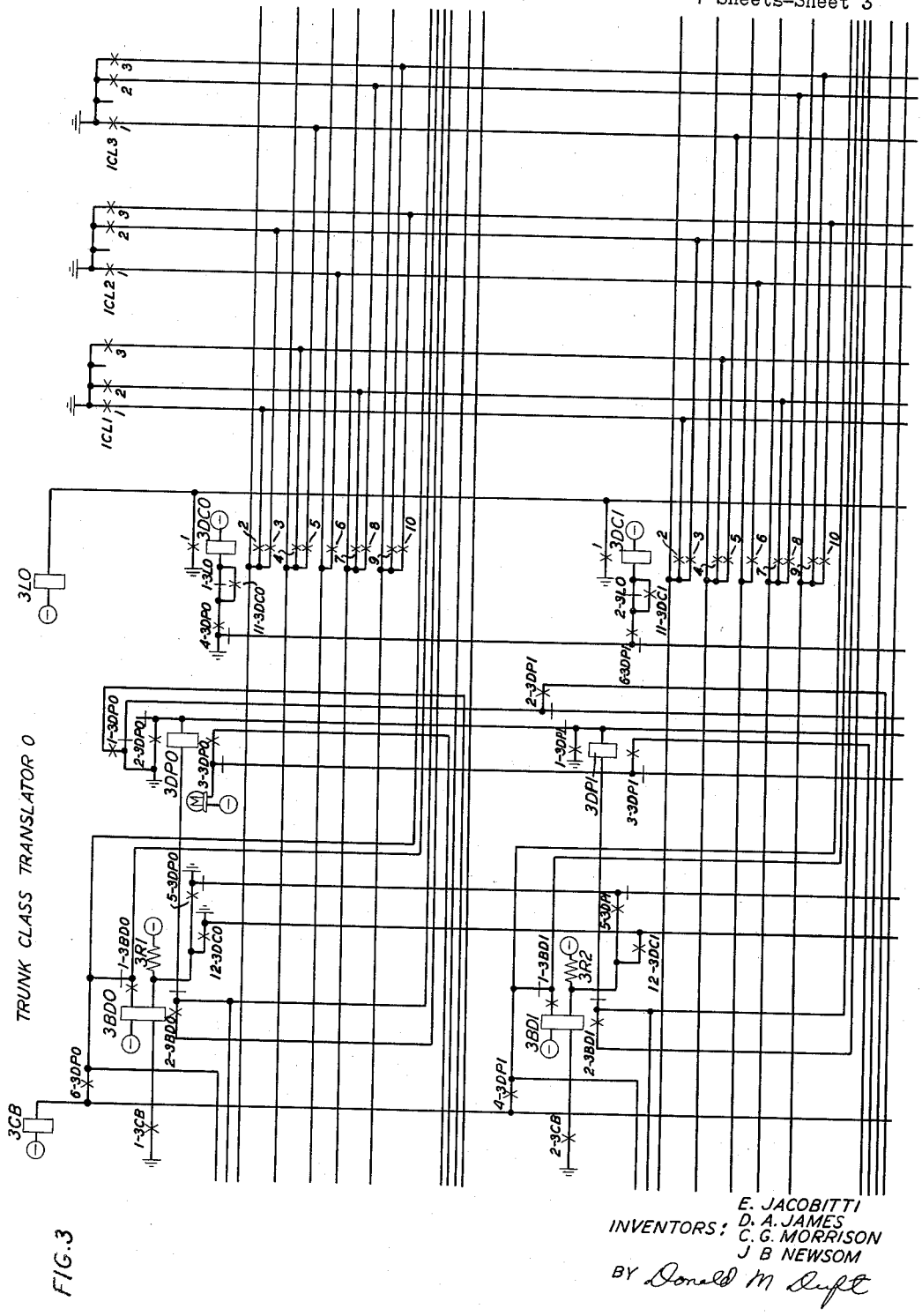
Figure 4:
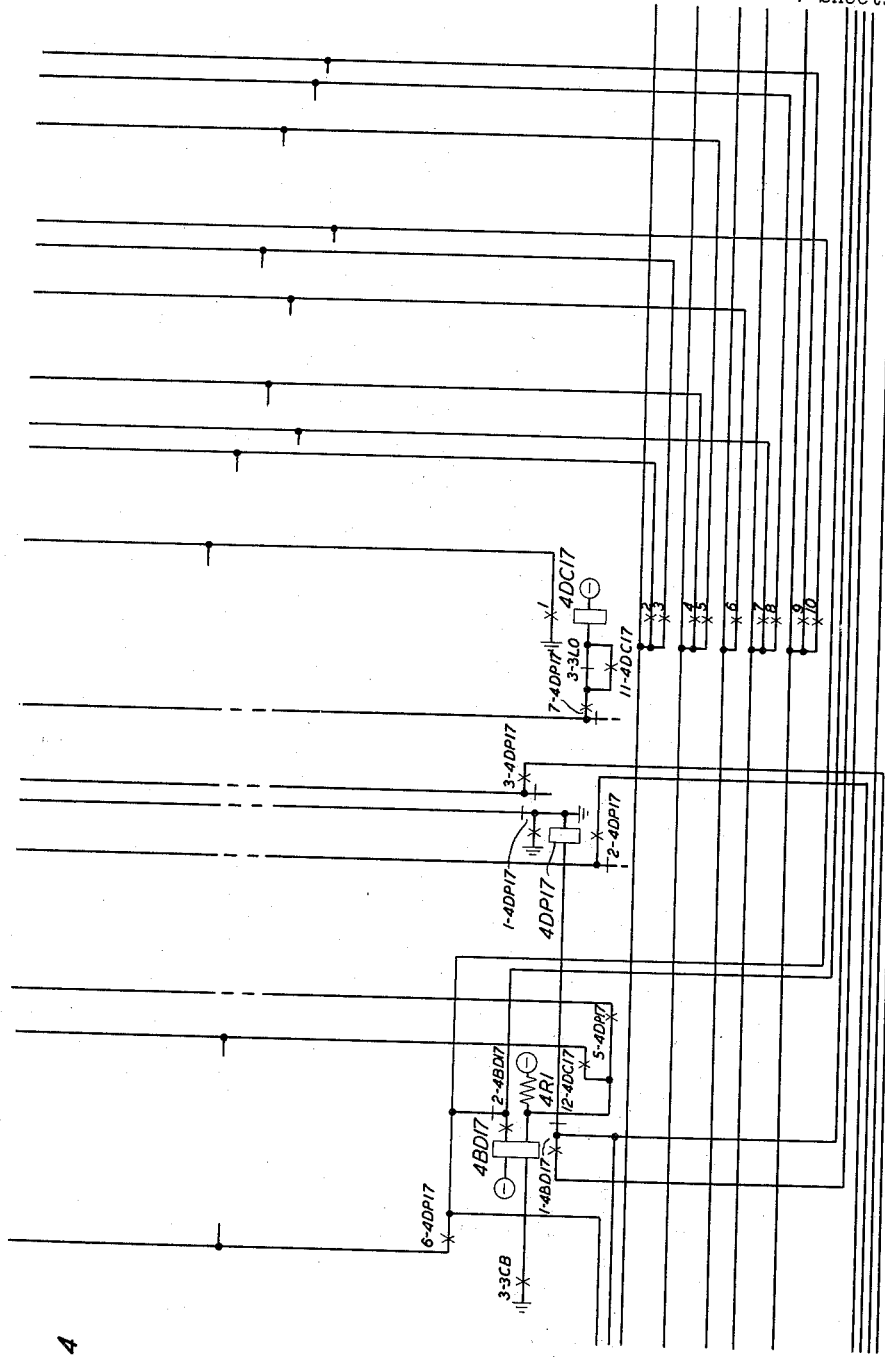

The operation of a BD-relay opens the operation path for its like numbered DP-relay on FIGS. 3 and 4 and, therefore, any operated DP-relay on FIGS. 3 and 4 associated with a non-preferred BD-relay will release upon the operation of its associated BD-relay. For example, referring to the situation discussed a moment ago where both relays 3DP0 and 4PD17 were assumed to be operated, the preference chain associated with the BD-relays prefers relay 3BD0 and, therefore, applies a ground from make contacts 5–3DP0 to the right side of the lower winding of relay 3DP0, thereby shunting out the resistance battery supplied by resistor 3R1 and preventing this relay from operating when relay 3CB operates. Contacts 5–4DP17 are also operated, but they are unable to supply a ground to the right side of the lower winding of relay 4BD17 since this ground was removed by the operation of break contacts 5–3DP0. Therefore, the resistance battery on the winding of relay 4BD17 is not shorted out and it operates along with the other relays in the BD-relay group even though its associated DP-relay is operated.

Therefore, it may be seen that even if more than one of the DP-relays is operated momentarily, that one, and only one, of the BD-relays may remain unoperated when relay 3–CB operates. The non-operation of one of the BD-relays such as, for example, relay 3BD0, as the rest of the relays in the chain operate, indicates that class translator 0 shown in FIGS. 3 and 4 is now serving decoder 0. The operation of the rest of the BD-relays on FIGS. 3 and 4 disconnects the remainder of the decoders from the DP-chain of relays on FIGS. 3 and 4 and interconnects them with a similar chain on FIGS. 5 and 6. It is explained hereinafter how the circuit shown on FIGS. 5 and 6 can serve a second decoder while the first decoder is being served by the circuits of FIGS. 3 and 4.

Relays 3DC0, 3DC1 through 4DC17, which constitute the DC-chain of relays, are operated by a ground supplied by a third preference chain made up of another set of contacts on the DP-relays. This preference chain works in the same way as those already described and insures that only one relay in the DC-group can be operated at any one time regardless of how many DP-relays are operated.

Continuing with our previous example in which both relays 3DP0 and 4DP17 were both operated for a short instant of time before relay 4DP17 released due to the operation of relay 4BD17, relay 3DC0 now operates from ground on make contacts 4–3DP0. The operation of relay 3DC0 operates relay 3L0 from ground on make contacts 1 of relay 3DC0. Relay 3L0 operated opens the operating paths for the other relays in the DC-group on FIGS. 3 and 4. Relay 3DC0 remains operated as relay 3L0 operates since closed contacts 11–3DC0 shunt the break contacts 1 of relay 3L0.

Decoder 0 is ready to receive class mark information from class translator 0 once relay 3DC0 operates. The transmission of class mark information to a decoder is manifested by the operation of a certain number of class mark information receiving relays in the decoder. For example, referring to decoder 0 it contains relays 1A0, 1A1, 1A2, 1R1 and 1R2. Depending upon the nature and characteristics of the calling trunk, a certain combination of these relays in decoder 0 operate upon the transmission of the trunk class information from the class translator circuit. Various combinations of these relays operate as calls come into the office over the different trunk groups and, the operation of these relays control the subsequent circuit operations so that the decoder and the circuits controlled by the decoder may process each call in the proper manner.

Each of the other decoders has a similar group of relays as those described for decoder 0 and, as each of the 18 decoders serves incoming calls, each will have a certain combination of relays operated therein in response to its seizure of the class translator with the particular combination of relays operated for each call being dependent upon the characteristics of the incoming trunk serving the call. The corresponding relay in each decoder represents the same bit of class mark information and, therefore, as each decoder serves calls incoming over the same trunk group, each will have the same combination of relays operated by the class translator.

The particular combination of class mark data transmitted to the decoder by the class translator for a certain call is determined by the incoming trunk circuit serving the call. From this, it naturally follows that once a decoder seizes a class translator in an attempt to obtain class mark information, the class translator must have some means of knowing what combination of class mark data should be transmitted to the decoder. The problem is complicated by the fact that any incoming office may have a vast number of incoming groups of trunks, each group of which has its own individual combination of class mark data. The circuit now to be described enables the class translator to determine the proper combination of class mark data that should be transmitted to the decoder for each call.

Some of the larger switching offices now in use have a capacity of 10,000 lines or trunks while others may have a capacity of only one or two thousand lines or trunks. The commercial version of the system disclosed by J. W. Gooderham et al., when used with the present invention, has a capacity of about 2,000 incoming trunks insofar as practical and economical considerations are concerned. Three of these trunks are shown on FIG. 1 of the drawings and are designated trunks 00, 20 and 40, respectively. Each trunk is assumed to be in a different trunk group in order to illustrate certain features of the present invention. The input connections to these trunks are not shown since they form no part of the present invention. However, since each of the three trunks has been assumed to be part of a different trunk group, each of the three will have its own individual calling characteristics which distinguish it from the trunks in other trunk groups.

For example, trunk 00 and all other trunks in the same group may represent operator trunks, for example, and therefore, the decoder should receive information to this effect from the class translator so that no attempt will be made to make a bill for calls incoming over trunks in this group. Trunk 20, as well as all other trunks in its group, may, for example, be connected to a local office having its own automatic message accounting equipment and, therefore, the decoder, when serving calls from this trunk group, should receive class mark information to this effect so that the automatic message accounting equipment at the toll or tandem office will not duplicate the records made by equipment at the central office. On the other hand, trunk 40, as well as all other trunks in the same group, may, for example, serve local offices having no automatic message accounting equipment of their own, and, therefore, when the decoder serves calls incoming over this trunk group it should receive class mark information indicating this situation so that it may cause the automatic message accounting equipment at the toll or tandem office to make a record of the call.

Summarizing this discussion concerning the incoming trunk groups, the important point to understand, is that each trunk group has its own peculiar and distinguishing combination of calling characteristics and, therefore, when the decoder serves a call, it must receive from the class translator the combination of class mark data representing the calling trunk so that the decoder will know what circuit actions to take in connection with the call.

Figure 1:
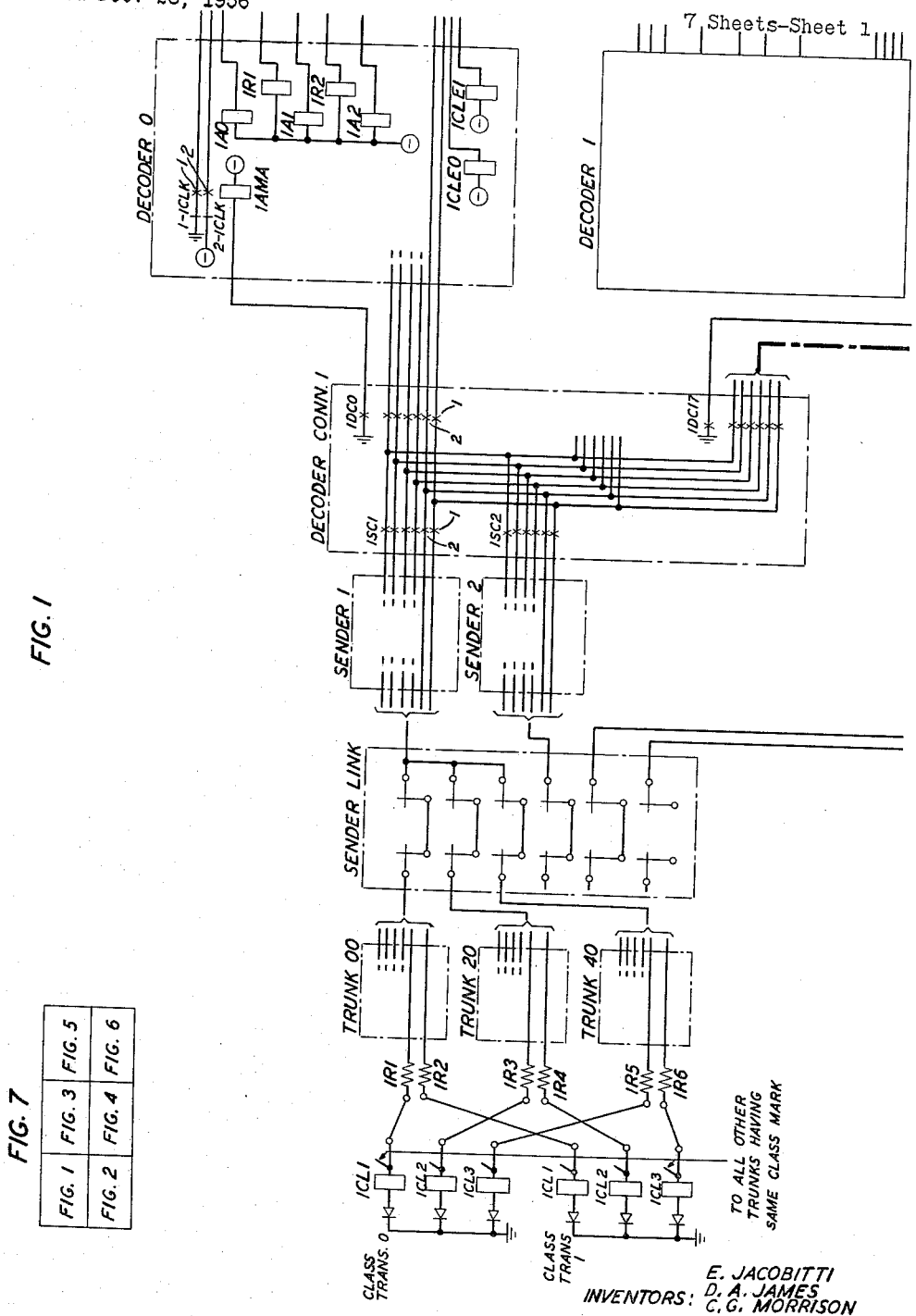
Figure 2:
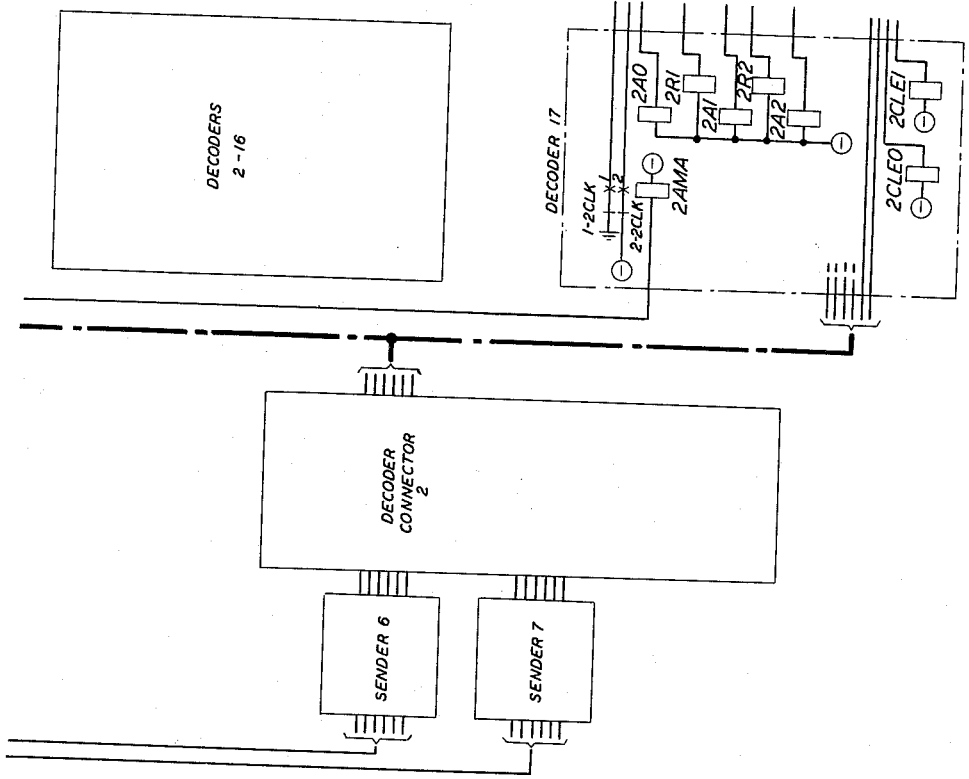

Each class translator has a plurality of output relays, one for each group of incoming trunks. If a particular office had 50 different incoming trunk groups, the class translator in that office would, accordingly, have 50 output relays. Because of size and space limitations, FIG. 1 of the drawings shows only three output relays in each translator instead of the usual 50 or 100 that one could normally expect to find in a commercial installation. The three relays shown on the top left in FIG. 1 are associated with class translator 0, while the three relays shown on the lower left of FIG. 1 are associated with class translator 1. The contacts for the three output relays in class translator 0 are shown in the upper right-hand portion of FIG. 3 while the contacts for the three output relays of class translator 1 are shown in the upper right-hand portion of FIG. 5.

The contacts on each output relay are wired so that the operation of the relay transmits the desired combination of class mark data representing with the calling trunk to the decoder. Each of the relays is individually associated with a different trunk group and, therefore, each has its contacts wired to transmit a different and unique combination of class mark data.

Each class translator has an identical number of output relays and the corresponding relays in each translator are associated with the same trunk groups. The contacts of corresponding relays are wired identically so that the operation of either one will present the same class data to the decoder. The provision of similarly wired relays in each class translator increases the capacity of the office since it allows a decoder to be served by the circuit shown on FIGS. 5 and 6 in the event that the circuit shown on FIGS. 3 and 4 is busy at the time.

The incoming trunks are associated with the various output relays in each class translator by means of the cross-connections shown in the left-hand part of FIG. 1. Trunk 00 is connected to class relay 1 designated 1CL1 in each of the translators. Trunk 20 is connected to relay 1CL2 in each translator while trunk 40 is connected to relay 1CL3. The strapping on the right side of these relay windings indicates that all trunks in the office having the same class marks as either trunk 00, trunk 20 or trunk 40 are connected to the same class relays. In practice, all trunks having the same combination of class marks are arranged so as to form a single group of trunks all of which are connected to the same class relay in each class translator. Therefore, not only trunk 00 is connected to relay 1CL1 in each class translator but, in addition, all the other trunks in the same group as trunk 00 are also connected to the same relays. The same arrangement also exists between trunks 20 and 40 and the rest of the trunks in the groups of which they are a part.

The right-hand side of resistors 1R1 through 1R6 are connected to wires shown atop the rectangles representing trunks 00, 20 and 40. The fact that these wires are shown atop these various trunk circuits, but encounter no circuit elements therein, such as relays or contacts, indicates that although they are functionally associated with these trunks, they go through no circuit elements within the trunks. These wires actually go directly from the right-hand side of resistors 1R1 through 1R6 to the left-hand side of the sender links shown in FIG. 1. The wires are shown atop the various trunk circuits only in order that the concept utilized in the present invention may be more easily appreciated.

The sender link, shown diagrammatically in FIG. 1, may be of any type suitable for the purpose of connecting any one of a plurality of incoming trunks to any one of a plurality of sender circuits. In the J. W. Gooderham et al. disclosure the sender link is disclosed as comprising a plurality of well-known crossbar switches. The sender link shown in FIG. 1 is identical to the sender link shown in the J. W. Gooderham disclosure in every respect except that two extra contacts have been added to each crosspoint in order to provide circuit paths through the link for the wires connected to the two class relays associated with each trunk.

When the sender link operates it closes the proper crosspoints to interconnect the calling incoming trunk with an idle sender. This interconnection is shown by the four wires leading from inside of trunk 00 into the bracket on the left side of the link and then shown leaving the bracket on the right side of the link and entering sender 1 (assuming that trunk 00 is connected by the sender link to sender 1). In addition to the direct connection between trunk 00 and sender 1, the sender link also interconnects by means of the two additional contacts on each crosspoint the wires leading from resistor 1R1 and resistor 1R2 through and across sender 1 to the contacts of relay SC1 in the decoder connector 1. The wires leading across sender 1, but encountering no circuit elements therein, indicate that these wires are functionally associated with sender 1, but yet, do not touch it in any way.

After the sender is connected by means of the sender link to the trunk circuit, the sender receives information, such as in the form of dial pulses or multi-frequency pulses, representing the desired called party's area code, office code and numericals. The sender, after receiving this information connects itself with an idle decoder by means of the decoder connector. The decoder connector is shown on FIG. 1 and is the same as the decoder connector shown in the J. W. Gooderham et al. system with the exception that two extra contacts are provided on certain of the relays, such as on relay 1SC1, 1SC2, 1DC0 and 1DC17 in order to handle the two wires leading from the class relays on the left side of FIG. 1 to the class translator circuits shown in FIGS. 3, 4, 5 and 6.

The purpose of the decoder connector is to connect any one of the senders it serves to any one of the 18 decoders in the office. Relays 1SC1 and 1DC0 would operate in decoder connector 1 in the event that it interconnects sender 1 with decoder 0. Similarly, if sender 2 is to be connected to decoder 17, relays 1SC2 and 1DC17 would be operated to effect this interconnection. The operation of relays 1SC1 and 1DC0 interconnects the four wires running from the circuits within sender 1 to the four wires running to certain circuits within decoder 0. The operation of these two relays also connects the wires leading from resistors 1R1 and 1R2 through the sender link circuit to the circuits shown in FIG. 3 and FIG. 5, respectively. The closure of these circuits effects the circuit operations about to be described which cause the class mark data to be transmitted to decoder 0.

The operation of relay 3DP0 extends a battery from the resistance lamp connected to contacts 3–3DP0, through make contacts 3–3DP0, through contacts 2 of relay 1DC0 in decoder connector 1, through contacts 2 of relay 1SC1, through the crosspoints in the sender link, through resistor 1R1 to the winding of relay 1CL1 in class translator 0. Relay 1CL1 now operates since it has a ground on the left side of its winding and a resistance battery on the other side. The operation of relay 1CL1 in class translator 0 closes its contacts 1, 2 and 3 shown on the upper part of FIG. 3.

It has previously been described how relay 3DC0 operated. The operation of relay 3DC0 and relay 1CL1 close the circuit paths about to be described to transmit the class data to the decoder 0. A ground is extended from make contacts 1 of relay 1CL1, through make contacts 2 of relay 3DC0, to decoder 0 wherein it operates relay 1A0. A ground is also extended from make contacts 2 of relay 1CL1, through make contacts 7 of relay 3DC0, to operate relay 1R2 in decoder 0. A ground is also extended from make contacts 3 of relay 1CL1, through make contacts 4 of relay 3DC0, to operate relay 1R1 in decoder 0.

Relays 1A0, 1R1, 1A1, 1R2, and 1A2 in decoder 0 comprise the input circuit in the decoder which receives class mark information. The operation of each of these relays represents a certain bit of class mark information and, therefore, the operation of a combination of these relays by the class translator represents the class mark information associated with the trunk handling the call now being served by the decoder.

The operation of relay 3DP0 closes a circuit from ground on contacts 1–3DP0 to operate relay 1CLE0 in the decoder 0. The operation of this relay indicates that decoder 0 has engaged class translator 0. The operation of this relay may be arranged to effect whatever subsequent circuit operations in the decoder that may be desired upon the receipt of this information.

The class mark information receiving relays in decoder 0, relays 1A0, 1R1, 1A1, 1R2, and 1A2, are shown in simplified form for the purpose of this disclosure. Actually each decoder will have a far greater number of these relays, such as, for example, 20 to 30. Decoder 17, as well as all the other decoders, has a similar group of relays by means of which it receives class mark information.

Each decoder must receive a certain number of bits of class mark information before it can proceed with the call. The decoders in the various offices receive different quantities of class mark information depending upon the nature of the calls handled by each office. However, all the decoders within a single office receive the same quantity of class mark information for all the calls they serve. This means that the same number of class mark information receiving relays are operated in the decoder for each call. This allows an automatic check circuit to be used in the decoder so that the reception of an improper quantity of information may be distinguished from a proper quantity of class mark information. For example, with reference to the decoder shown in FIGS. 1 and 2 wherein only five class mark information receiving relays are shown, the class translator delivers three bits of information to a decoder when it is seized. Therefore, the reception of any number of bits of information other than three would indicate an improper circuit operation. Accordingly, the contacts on each of the five class mark relays in each decoder could be wired so as to form the well known three-out-of-five circuit in which a control relay is operated when, and only when, three-out-of-five relays are operated. With this circuit, the control relay will be operated only when three relays are operated and the operation of either less than, or more than, three relays will leave the control relay unoperated.

The above example of the check circuit utilizing five relays is merely illustrative. In practice, the decoder will have many more of these relays than five and the desired check circuit will be arranged to be operative upon the operation of the number of class mark relays determined by the traffic conditions in each office.

Contacts 1–1CLK and 2–1CLK in decoder 0 and 1–2CLK and 2–2CLK in decoder 17 may be associated with the check relays and, accordingly, would be opened when their associated relays operate in response to the operation of the proper number of class mark relays. The opening of contact 1–1CLK in response to the operation of its relay as the decoder receives the proper number of class marks from translator 0, removes the ground supplied to the winding of relay 3CB through contacts 6–3DP0, thereby releasing it. All the operated BD-relays in FIGS. 3 and 4 release as contacts of relay 3CB open and remove ground from the left-hand side of the lower winding on each of these relays.

Contacts 2–1CLK in decoder 0 open as relay 1CLK operates. The opening of these contacts breaks the path from negative battery in decoder 0 through contacts 2–1CLK, through break contacts 2–3BD0, to the winding of relay 3DP0 which now releases. The release of relay 3DP0 breaks the circuit for relay 1CL1 at contacts 3–3DP0 thereby releasing it. The release of relay 3DP0 also opens make contacts 1–3DP0 thereby releasing relay 1CLE0. The release of relay 3DP0 also opens make contacts 4–3DP0 thereby releasing relay 3DC0.

The release of relay 3DC0 opens its make contacts 1 thereby releasing relay 3L0. The release of relay 3L0 closes its contacts 1–3L0 in the circuit of relay 3DC0 and closes similar make contacts in the circuit for the other DC-relays on FIGS. 3 and 4 thereby allowing one of them to operate in connection with the serving of the next call.

The operation of relay 1CLK may also be arranged to effect whatever subsequent operations may be desired in the decoder concomitant to the receipt of the proper quantity of class mark information. For example, its contacts could be inserted into already existing circuits in the decoder to block all subsequent operations thereof in the event that relay 1CLK does not operate, thereby manifesting the receipt of an improper quantity of class marks.

The circuit shown in FIGS. 3 and 4 is now in a normal condition and can handle the next call offered by a decoder.

Figure 5:
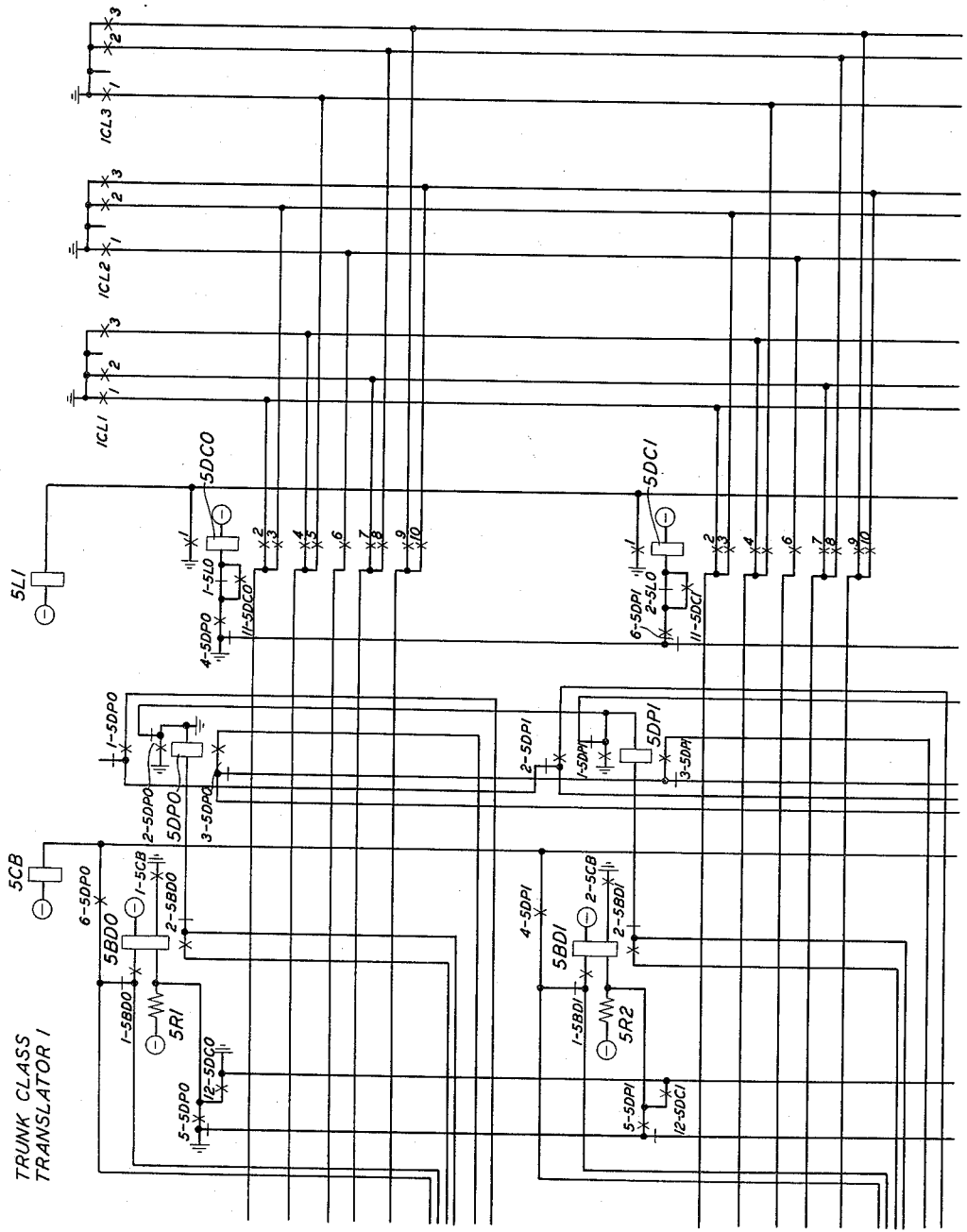

The circuit shown on FIGS. 3 and 4 comprises a first class translator, designated translator 0, while the circuit shown on FIGS. 5 and 6 comprises a second class translator, designated class translator 1. The provision of two class translators allows twice as many decoders to be served as could be done with a single class translator. The provision of two class translators also offers the advantage that service in the office need not be disrupted if one becomes inoperative for any reason. These two circuits cooperate with each other so that a decoder seeking class information first attempts to seize the class translator, shown in FIGS. 3 and 4, and finding it busy, will then seize the translator shown in FIGS. 5 and 6, if it is idle at the time. This relationship may be best illustrated by reference to an assumed hypothetical situation. For example, assume that decoder 0 is first seized by a sender and that a short time later decoder 17 is seized by another sender. When decoder 0 is seized, its relay 1AMA is operated which, in turn, operates relay 3DP0 in the preference chain. The operation of relay 3DP0 effects the circuit operations already described to cause all relays in the BD-chain of the translator 0, other than relay 3BD0, to operate. From here on out translator 0 serves decoder 0 in the manner already described.

The 18 decoders and the pair of class translators might advantageously be arranged so that the even numbered decoders prefer class translator 0 while the odd numbered decoders prefer class translator 1. In this arrangement, the odd numbered decoders, such as decoder 17, would not be wired exactly as shown on the drawings but instead, would be wired so that the operation of relay 2AMA would attempt to extend a ground to operate relay 6DP17 in class translator 1 in an attempt to seize this circuit. In the event that class translator 1 is busy, relay 6BD17 would be operated and the ground from relay 2AMA would be extended through make contacts 1–6BD17 and then through break contacts 1–4BD17 to operate relay 4DP17 in an attempt to seize class translator 0. The even numbered decoders would be wired exactly as shown herein. This arrangement would be advantageous since it would equalize wear among the two class translators during periods of light traffic.

Relay 2AMA in decoder 17 operates when it is seized by the decoder connector. The operation of this relay attempts to operate relay 4DP17 by means of contacts 2 on relay 2AMA. However, relay 4DP17 cannot operate since relay 4BD17 operated in response to the seizure of this class translator by decoder 0 and opened the path to relay 4DP17 at contacts 1–4BD17. Therefore, a circuit is now extended from negative battery on contacts 2 of relay 2AMA, through make contacts 1–4BD17, through normal contacts 1–6BD17 to the winding of relay 6DP17. This relay and the chain of relays in which it is located is identical to the DP-chain of relays shown on FIGS. 3 and 4, and therefore, relay 6DP17 now operates from the permanent ground on the right-hand winding terminal of relay 5DP0. The operation of this relay effects the subsequent circuit operations which are similar to that already described in connection with decoder 0.

The next decoder seized by a sender will be served by the class translator that first finishes the serving of the previous seized decoder. Thus, if decoder 0 seizes class translator 0 a short time before decoder 17 seized class translator 1 then, in all probability, class translator 0 would finish serving decoder 0 before the other translator finished serving decoder 17 and, therefore, would be the first one available to serve the next decoder seeking service.

The present disclosure has been simplified as much as possible in order to present a clear understanding of the present invention. Accordingly, there are a great many places on the drawings where only a few relays or circuit elements have been shown in spite of the fact that in the commercial embodiment of the present invention there would probably be a far greater number of these relays or circuit elements. For example, only three class relays are shown on the left-hand side of FIG. 1 in each class translator when actually the commercial embodiment could have, for example, from 30 to 50 of such relays. Similarly, only three trunks are shown when actually an office might have 2,000 trunks. A similar situation exists with respect to the sender links, the senders, and the decoder connectors. Therefore, many modifications and changes as well as other methods of application will be readily apparent to those skilled in the art.

For example, the transverter circuit shown diagrammatically in FIG. 8 also requires class mark information in essentially the same manner as does the decoder. Therefore, the present invention could be expanded to supply the transverter with the class information it requires. This could easily be done by expanding the DP-, BD-, and DC-series of relays on FIGS. 3, 4, 5, and 6 so that there would be one of each for every transverter and decoder just as now there is one of each for every decoder.

For example, if a particular office had 18 decoders and 10 transverters and, if it were desired to provide class information to both by means of the present invention, there would then be 28 relays in each of the DP-, BD-, and DC-series of relays. Each of the series would be incorporated into a preference circuit similar to that shown on FIGS. 3 and 4 or 5 and 6, so that any one of the 28 units of equipment would have an opportunity to seize the class translator in a predetermined order of preference. In an arrangement like this, the class translator would be seized and released twice for each call, first by the decoder and then by the transverter since the transverter does not need the class information until a substantial period of time after the decoder receives its information.

The above principle and operation could be expanded almost without limits so that for each call any desired number of different common control equipment units could be successively served class mark information by a single class translator circuit. All that would be required would be the furnishing of an individual DP-, BD-, and DC-relay for each of the circuits that are to have access to the class translator.

It is to be understood that the above-described arrangements are merely illustrative of the application of the principles of the invention. Numerous other arrangements may be devised by those skilled in the art without departing from the spirit and scope of the invention.

What is claimed is:

1. In combination, a plurality of groups of trunks for serving incoming calls with all trunks within a group having identical calling characteristics and with the trunks in each group having a combination of said characteristics different from the trunks in other groups, common control equipment selectable by and connectable to any of said trunks in response to the presence of an incoming call thereon, a class circuit comprising a plurality of relays each of which is individually related to one of said groups of trunks, means effective upon the interconnection of a trunk serving an incoming call with said common control equipment to operate the relay in said class circuit that is related to said calling trunk, and means responsive to the operation of said relay to transmit to said common control equipment data representing the characteristics of said calling trunk.

2. In combination with a telephone switching system having trunks for serving incoming calls and common control equipment connectable to any of said trunks, a class circuit for supplying trunk class information to said common control equipment, a plurality of output relays in said class circuit each of which is exclusively related to one or more of said trunks, means operable in response to the presence of an incoming call on one of said trunks to interconnect said one trunk with said common control equipment, means responsive to the operation of said last-named means to interconnect said common control equipment with said class circuit, means effective upon said last-named interconnection to operate the output relay associated with the trunk serving said incoming call, and means responsive to the operation of said output relay to transmit class data pertaining to said last-named trunk to said common control equipment.

3. In a switching system, a plurality of lines having different calling characteristics for serving incoming calls, common control circuits, a class circuit operable for supplying data pertaining to said lines, means including a cross-connection means whereby any one of said lines serving an incoming call may be interconnected with any one of said common control circuits, means effective upon said interconnection for interconnecting said class circuit to said one common control circuit, and means including said cross-connection means whereby upon the interconnection of said common control circuit and said class circuit said class circuit transmits to said one common control circuit data pertaining to the line serving the incoming call.

4. In a common control switching system for serving incoming calls, a plurality of groups of incoming trunks with each group having its own distinctive combination of class marks, common control equipment connectable to any of said trunks, means responsive to the presence of an incoming call on one of said trunks for interconnecting said one trunk with said common control equipment, a pair of class translator circuits each of which has an idle and a busy condition, means in each class translator circuit for supplying class mark data pertaining to said incoming trunks to said common control equipment, means in said common control equipment effective upon its interconnection with said one trunk for interconnecting said common control equipment with the first class translator in said pair when said first class translator is idle to obtain the class mark data pertaining to said one trunk, means in said common control equipment effective upon its interconnection with said one trunk for interconnecting said common control equipment with the second class translator in said pair when said first class translator is busy, and means responsive to said last interconnection whereby said common control equipment receives the class mark data pertaining to said one trunk.

5. In a common control switching system for interconnecting incoming trunks to outgoing trunks in response to call signals on said incoming trunks, common control equipment connectable to any of said incoming trunks, a plurality of groups of incoming trunks with each group having its own distinctive combination of calling characteristics, means responsive to the presence of a call signal on one of said trunks for interconnecting said one trunk with said common control equipment, a pair of class translator circuits each of which has an idle and a busy condition, means in each class translator circuit for supplying class mark data pertaining to the calling characteristics of said incoming trunks to said common control equipment, means in said common control equipment effective upon its interconnection with said one trunk for interconnecting said common control equipment with the first class translator in said pair when said first class translator is idle, means responsive to said last interconnection whereby said common control equipment receives the class data pertaining to said one trunk, means in said common control equipment effective upon its interconnection with said one trunk for interconnecting said common control equipment with the second class translator in said pair when said first class translator is busy, and means responsive to said last interconnection whereby said common control equipment receives the class data pertaining to said one trunk.

6. In a common control switching system, a plurality of groups of incoming trunks for serving calls with each group having its own distinctive combination of class marks, a plurality of units of common control equipment connectable to any of said incoming trunks, a class translator circuit for supplying class mark data pertaining to said incoming trunks to said units of common control equipment, means in said class translator circuit for arranging said units of common control equipment in a preferred order of availability, means effective upon the receipt of call signals by two or more of said incoming trunks whereby two or more units of said common control equipment attempt to seize said class translator circuit, and means whereby only one of said common control equipment units is effective to seize said class translator circuit and receive said class mark data.

7. In combination, a plurality of groups of trunks for serving incoming calls with all the trunks within a group having identical calling characteristics and with the trunks in each group having a combination of said characteristics different from the trunks in other groups, a plurality of units of common control equipment selectable by and connectable to any of said trunks in response to the presence of an incoming call thereon, a class translator circuit, a plurality of relays in said class translator circuit each of which is individually related to one of said groups of trunks, a preference circuit in said class translator circuit for arranging said plurality of units of common control equipment in a preferred order of availability, means effective upon the receipt of incoming calls by two or more of said incoming trunks whereby two or more units of said common control equipment attempt to seize said class translator circuit, means including said preference circuit whereby only one of said common control equipment units is interconnected with said class translator circuit, means effective upon the interconnection of said class translator circuit and said common control equipment whereby the one relay operates in said class translator circuit that is related to the calling trunk currently served by said last-named common control equipment, and means responsive to the operation of said one relay to transmit to said last-named common control equipment data representing the characteristics of said last-named calling trunk.

8. In a communication switching system having a plurality of groups of trunks for serving incoming calls, a plurality of units of common control equipment, a cross-connection medium for interconnecting any incoming trunk serving a call with any of said units of common control equipment, a class translator, a plurality of relays in said class translator each of which is individually related to certain ones of said trunks, means effective upon the receipt of a call by one of said trunks and subsequent to its connection with said common control equipment for interconnecting said common control equipment with said class translator, means responsive to said last-mentioned interconnection whereby a circuit is prepared to operate the one of said plurality of the relays that is related to the calling trunk, and means in said cross-connection medium for completing said circuit to operate said last-named relay.

9. In combination, a plurality of trunks for serving incoming calls, a plurality of units of common control equipment selectable by and connectable to said trunks in response to the presence of an incoming call thereon, a class translator, a plurality of relays in said class translator circuit each of which is individually related to certain ones of said trunks, a preference circuit in said class translator for arranging said plurality of units of common control equipment in a preferred order of availability, means effective upon the receipt of incoming calls by two or more of said incoming trunks whereby two or more units of said common control equipment attempt to seize said class translator, means including said preference circuit whereby only one of said common control equipment units is interconnected with said class translator circuit, means effective upon the interconnection of said class translator circuit and said common control equipment whereby the one relay operates in said class translator circuit that is related to the calling trunk currently served by said last-named common control equipment, and means responsive to the operation of said one relay to transmit data pertaining to said last-named trunk to said last-named common control equipment.

10. In a communication switching system for serving incoming calls, a cross-connection medium having a plurality of input terminals and a plurality of output terminals, a plurality of incoming trunks each of which is connected to one of said input terminals, a plurality of common control equipment units each of which is connected to one of said output terminals, a class translator for transmitting data pertaining to said trunks to said units of common control equipment, means effective upon the receipt of a call by one of said incoming trunks to establish a path comprising a plurality of crosspoints through said medium between said calling trunk and one of said common control equipment units, means responsive to said establishment whereby said one unit of common control equipment is interconnected with said class translator, means including said crosspoints whereby a circuit is closed in response to said last-named interconnection to enable said class translator to ascertain the identity of said calling trunk, and means responsive to the ascertainment of said identity whereby said class translator transmits data pertaining to the trunk serving said incoming call to said common control equipment.

11. In a communication switching system for serving incoming calls, a crossbar switch sender link having a plurality of input terminals and a plurality of output terminals, a plurality of incoming trunks each of which is connected to one of said input terminals, a plurality of common control equipment units comprising senders and decoders and with each sender being connected to one of said output terminals, a class translator for transmitting data pertaining to said trunks to said decoders, means effective upon the receipt of a call by one of said incoming trunks to establish a path comprising a plurality of crosspoints on said sender link between the trunk serving said incoming call and one of said senders, means responsive to said establishment whereby one of said decoders is interconnected with said class translator, means including said crosspoints whereby a circuit is closed in response to said last-named interconnection to enable said class translator to ascertain the identity of the trunk serving said call, and means responsive to the ascertainment of said identity whereby said class translator transmits data pertaining to the trunk serving said incoming call to said one decoder.

12. In combination, a plurality of trunks for serving incoming calls, each of said trunks having a certain combination of class information associated therewith, common control equipment selectable by and connectable to any one of said trunks in response to the presence of an incoming call thereon, a class circuit selectively operable to supply class information pertaining to said trunks, means effective upon the interconnection of a calling trunk with said common control equipment to selectively operate said class circuit whereby it transmits to said common control equipment the class information associated with the said calling trunk, additional common control equipment for serving said calling trunk, means for operating said additional common control equipment after said first mentioned common control equipment receives said class information, means responsive to the operation of said additional common control equipment for interconnecting it with said class circuit, and means effective upon said last mentioned interconnection whereby said class circuit is selectively operated to transmit to said additional common control equipment the class information associated with said calling trunk.

13. A plurality of groups of trunks for serving incoming calls with all trunks comprising a group having identical calling characteristics and with each group having a combination of said characteristics different from every other group, common control equipment connectable to any of said trunks, switching means for connecting said common control equipment to one of said trunks in response to the presence of an incoming call thereon, a class circuit having a plurality of output relays each of which is individually related to one of said groups, means effective upon the interconnection of a calling trunk with said common control equipment to connect said class circuit to said common control equipment, means responsive to said last-mentioned connection to operate over a path including said switching means the output relay in said class circuit that is related to said calling trunk, and means responsive to the operation of said relay to transmit to said common control equipment data representing the characteristics of said calling trunk.

14. In a telephone switching system having trunks for serving incoming calls and common control equipment connectable to any of said trunks, a class circuit for supplying trunk class information to said common control equipment, a plurality of output relays in said class circuit each of which is exclusively related to one or more of said trunks, switching means operable in response to the presence of an incoming call on one of said trunks to interconnect said calling trunk with said common control equipment, means responsive to the interconnection of said calling trunk and said equipment to interconnect said equipment with said class circuit, means including said switching means whereby a circuit is prepared to operate the one of said plurality of output relays that is related to said calling trunk in response to the interconnection of said calling trunk and said common control equipment, and means responsive to the interconnection of said common control equipment and said class circuit for completing a path to operate said relay.

15. In a communication switching system having a plurality of groups of trunks for serving incoming calls, a plurality of units of common control equipment, a cross-connection medium having crosspoints for interconnecting any incoming trunk serving a call with any one of said units of equipment, a class translator having a plurality of relays each of which is individually related to certain ones of said trunks, means effective upon the receipt of a call by one of said trunks and subsequent to its interconnection over a particular combination of said crosspoints with one of said units of common control equipment for interconnecting said one unit of equipment with said class translator, means including said combination of crosspoints whereby a circuit is prepared to operate the one of said plurality of the relays that is related to said calling trunk in response to the interconnection of said calling trunk and said one unit of common control equipment, and means responsive to the interconnection of said common control equipment and said class translator for completing a path to operate said relay.

References Cited in the file of this patent
UNITED STATES PATENTS

| | | |
|---|---|---|
| 2,352,492 | Ostline | June 27, 1944 |
| 2,491,291 | Voss | Dec. 13, 1949 |
| 2,698,879 | Shepherd | Jan. 4, 1955 |
| 2,775,648 | Newstedt | Dec. 25, 1956 |
| 2,868,884 | Gooderham et al. | Jan. 13, 1959 |